United States Patent
Morfill et al.

[11] Patent Number: 5,822,466
[45] Date of Patent: Oct. 13, 1998

[54] METHOD AND MEANS OF SPATIAL FILTERING

[75] Inventors: Gregor Eugen Morfill; Herbert Scheingraber; Gerda Wiedenmann, all of München, Germany

[73] Assignee: Max-Planck-Gesselschaft zur Forderburg der Wissenschaften e. V, Munich, Germany

[21] Appl. No.: 549,711

[22] PCT Filed: May 27, 1994

[86] PCT No.: PCT/EP94/01752

§ 371 Date: Mar. 18, 1996

§ 102(e) Date: Mar. 18, 1996

[87] PCT Pub. No.: WO94/28500

PCT Pub. Date: Dec. 8, 1994

[30] Foreign Application Priority Data

May 27, 1993 [DE] Germany .......................... 43 17 746.8

[51] Int. Cl.[6] .............................. G06K 9/00; G06K 9/76; G06K 9/40; G06K 9/64

[52] U.S. Cl. .......................... 382/260; 382/168; 382/210; 382/255; 382/264; 382/275; 382/278; 382/279

[58] Field of Search ...................................... 382/260, 255, 382/264, 275, 278, 279, 168, 210

[56] References Cited

FOREIGN PATENT DOCUMENTS 525592A 5/1993 European Pat. Off. .

OTHER PUBLICATIONS

Determination of f (x) for a limited random point set, Physical Review A, vol. 40, No. 7, Oct. 1, 1989.
Chaos and Fractal Algorithms Applied to Signal Processing and Analysis, Simulation, vol. 60 No. 4, Apr. 1993.
Statistical Physics, Plasmas, Fluids, and Related Interdisciplinary Topics, Physical Review E, APS–AIP, vol. 47 3rd series Jan.–Jun. 1993.

*Primary Examiner*—Leo Boudreau
*Assistant Examiner*—Daniel G. Mariam
*Attorney, Agent, or Firm*—Iandiorio & Teska

[57] ABSTRACT

The invention relates to a method of spatial filtering a point distribution representing a structure buried in noise and each of the points of which are defined by n coordinate values of an n-dimensional space, wherein for each point the function representing the number of the points in an area around the point concerned as a function of a dimension of the area is established, and a scaling coefficient equal to the exponent (a) of a simple power function is determined which approximates as near as possible the function determined in step a) in a certain area having the dimension (d), furthermore the scaling coefficients of the points of a n-dimensional stochastic point distribution of a type equivalent to the point distribution to be filtered are determined, the difference between the scaling coefficients of the point distribution to be filtered and the scaling coefficients of the stochastic point distribution are determined, and the points, the scaling coefficients of which are contained in the difference and those more or less completely representing the structure free of noise are represented or further processed in at least a two-dimensional space.

5 Claims, 7 Drawing Sheets

METHOD AND MEANS OF SPATIAL FILTERING

BACKGROUND OF THE INVENTION

1. Field of the Invention

The invention relates to a method and a means of spatial filtering, enabling structures in n-dimensional spaces to be identified, even when these structures are buried in noise.

2. Description of the Related Art

For this purpose it is known to make use of the so-called "maximum entropy" and "maximum-likelihood" techniques of locally searching for density fluctuations. These known techniques, however, necessitate assumptions or advance information to be able to identify the structures concerned. Further drawbacks of these known methods are that an extension to more than two dimensions requires highly complicated computations, that non-uniform measurement parameters and many different correlations defeat processing and that the sensitivity in the case of irregular patterns having strongly uncorrelated noise is low.

Furthermore, from the publication by H. Atmanspacher et al. in PHYSICAL REVIEW A (GENERAL PHYSICS), Vol. 40, No. 7, October 1989, USA, pages 3954–3963; ATMANSPACHER H. ET AL. "Determination of F (alpha) for a Limited Random Point Set (Galaxy Distribution)" a technique is known with which by determining the f($\alpha$) spectrum in a mainly uncorrelated point set any correlated subsets existing may be identifed. A further technique is known from the publication by H. Ebeling et al. in PHYSICAL REVIEW E (STATISTICAL PHYSICS, PLASMAS, FLUIDS AND RELATED INTERDISCIPLINARY TOPICS), Vol. 47, No. 1 January 1993, USA, pages 704–710; EBELING H. & WIEDENMANN G "Detecting Structure in Two Dimensions Combining Voronoi Tessellation and Percolation". In this technique the raw data point field is split up into individual cells (Voronoi Tesselation) and the distribution of the cells compared to those anticipated in a statistical Poisson distribution.

SUMMARY OF THE INVENTION

The present invention is thus based with reference to this prior art on the object of defining a method and a means with which n-dimensional structures buried in noise are detectable relatively simply.

This object is achieved by the invention as characterized in the claims and as discussed in more detail in the following.

In accordance with a first aspect of the invention a method of spatial filtering a distribution of points, representing a structure buried in noise, each point of which is defined by n coordinate values of an n-dimensional space, is characterized by the following steps:

a) for each point ($Q_m$) the function is determined which represents the number (N) of the points in an area around the point concerned as a function of a dimension (d) of area, b) for each point a scaling coefficient ($a(Q_m)$) equal to the exponent (a) of a simple power function $$N \approx d^a$$

is determined which approximates as near as possible the function determined in step a) in a certain range of the dimension (d), c) the scaling coefficients of the points of a n-dimensional stochastic point distribution of a type equivalent to the point distribution to be filtered are determined, d) the difference between the scaling coefficients of the point distribution to be filtered and the scaling coefficients of the stochastic point distribution is determined, e) the points, the scaling coefficients of which are contained in the difference and which represent the structure substantially free of noise, are represented in at least a two-dimensional space.

In accordance with a second aspect of the invention a method of spatial filtering a distribution of points, representing a structure buried in noise, each point of which is defined by n coordinate values of an n-dimensional space, is characterized by the following steps:

a) for each point ($Q_m$) the function is established which represents the number (N) of the points in an area around the point concerned as a function of a dimension (d) of the area, b) for each point a scaling coefficient ($a(Q_m)$) equal to the exponent (a) of a simple power function $$N \approx d^a$$

is determined which approximates as near as possible the function determined in step a) in a certain range of the dimension (d), c) the scaling coefficients of the points of an n-dimensional stochastic point distribution of a type equivalent to the point distribution to be filtered are determined, d) each existing value of the scaling coefficients of the point distribution to be filtered stochastic point distribution is assigned a cumulative number (P(<a)) equal to the number of scaling coefficients of the distribution concerned which are greater than or equal to the corresponding scaling coefficients, divided by the total number of the measured scaling coefficients of the distribution concerned, the cumulative numbers of the stochastic distribution determined in this step being scaled such that they agree by their highest numerical values with the highest numerical values for the distribution to be filtered, e) the bins of the scaling coefficients of the stochastic point distribution to be filtered are split up into sub-bins;

f) for each sub-bin the Difference between the associated cumulative numbers determined in step d) and the point distribution to be filtered and the stochastic point distribution is generated, and g) the points, the scaling coefficients of which are contained in the difference and which represent the structure substantially free of noise, are represented in at least a two-dimensional space.

Step a) comprises preferably the following sub-steps:

a1) the point distribution is sampled and the coordinate values determined thereby of the individual points ($Q_m$) are stored;

a2) for each point coordinate, values neighboring the coordinates of the point are interrogated in successively greater distances by searching through the memory, as to whether these coordinates contain a point and the number of points determined thereby is stored as a function of the distance.

Step b) in the method preferably comprises further the following sub-steps:

b1) the function log N≈a log d is determined, N being the number of points and d a dimension of an area around the point being considered, and b2) the slope of a substantially straight portion of this function is determined and used as a spatial coefficient.

A preferred means of implementing a method in accordance with the invention comprises:

a) a means (100) for determining the coordinate values of each point;

b) a memory (102) for storing the coordinate values of each point;

c) a calculating means (104, 106, 108) determining for each point a scaling coefficient equal to the exponent (a) of a simple power function $$N = d^a$$

representing the number (N) of points in an area around the point concerned as a function of a dimension (d) of the area;

d) a device (112) for providing scaling coefficients of the points of a n-dimension stochastic point distribution of a type equivalent to the point distribution to be filtered, e) a device (116) for selecting the points of the point distribution to be filtered, which lie in a range of the scaling coefficients, in which the scaling coefficients of the point distribution to be filtered substantially differ from the scaling coefficients of the stochastic point distribution, and f) a device for representing the points to which the selected scaling coefficients are assigned.

The method and the means according to the invention are considerably superior to prior art and permit identification of structures which are so heavily buried in noise that the known methods are of no avail. The time and hardware expense required is low.

The method and the means according to the invention are applicable to value tuples of arbitrary dimensions. Preferred fields of application are automated image analysis, e.g. in medicine, as regards satellite photos and aerial photographs as well in material testing.

The method and the means in accordance with the invention are applicable to any point sets in n-dimensional coordinate spaces (n=natural number), the term "point" being understood both in a mathematical sense as well as a tuple of coordinates for identifying image pixels and the like. The corresponding coordinate spaces may have any whole-number of dimensions, which in practice is at least equal to 2. The coordinates are not limited to a uniform physical dimension, but may include e.g. space coordinates as well as one or more additional parameters, such as a color value, an energy value or the like. In a three-dimensional coordinate space, for instance, the first two coordinates may contain the location in a surface area and the third coordinate may contain a energy or color value transformed on a suitable scale. In the simplest case the scaling of the coordinates is selected such that the resulting point set is imagable in a unit square or a unit cube. Where a parameter changes with time ("time series") an n-dimensional coordinate space is selected, the point coordinates being determined by n measurements in sequence of the parameter of interest.

BRIEF DESCRIPTION OF THE DRAWING

The invention will now be explained in more detail, further advantages and features of the invention being discussed with reference to the drawing in which:

FIG. 4c is the spectrum of scaling coefficients of the point distribution in accordance with FIG. 4a;

FIG. 4e is the cumulative distribution function of the point distribution in accordance with FIG. 4a;

FIG. 5b is the spectrum of scaling coefficients for the point distribution in accordance with FIG. 5a;

FIG. 5c is the cumulative distribution function for the point distribution in accordance with FIG. 5a;

DESCRIPTION OF THE PREFERRED EMBODIMENTS

In the following the term "point" is to be understood in both the mathematic sense and as signifying a coordinate tuple, defining an image pixel or the like in each case. The coordinate spaces in which these points $Q_m$ are embedded may have any whole-number dimensions, in general, $\leq 2$. The coordinates are, as mentioned, not restricted to a uniform physical dimension, e.g. length.

The first step in the present method involves defining a so-called scaling coefficient for each point of the point distribution or point set to be analyzed (or, as is equivalent for the two-dimensional case, for each pixel of a raster or xy field). The scaling coefficient is determined from the point density in the area of the point considered, i.e. the number N of the points in the area concerned. In particular, assuming that the number of points N in the area of the point being considered obeys a simple power function (that is to say, one containing only a single power member)

$$N \approx d^a$$

the scaling coefficient for this point is defined as the exponent a of the power function.

Whether the number of points in a restricted area of a point under consideration obeys roughly a simple power function, and the exponent of this power function, may be easiest established from a double-logarithmic representation of the number of points N as a function of the diameter d:

$$\log N \approx a \log d,$$

a straight line materializing in such a representation in the case of a simple power function. The slope of this straight line is then the wanted scaling coefficient for the point concerned. In a non-circular area, e.g. in the case of a square area of a pixel of an xy raster, d signifies another corresponding dimensional parameter, e.g. the side length of a square forming the area.

For each point Q of the point set the associated scaling coefficient $a_Q$ and the associated point coordinates $x_Q$, $y_Q$, $z_Q$, ... are stored.

Once the scaling coefficients have been established for all points of the point set under investigation, the frequency distribution of the scaling coefficients is established, i.e. the number f(a) of each scaling coefficient (a) as a function of its value. In addition to this, the points of the point set under investigation belonging to each of the values of the frequency distribution of the scaling coefficients are stored.

For a perfectly statistical point set in the borderline case to the continuum all points have the same scaling coefficient, the frequency distribution then being reduced to a single value. This frequency distribution is then scaled so that in an n dimension coordinate space all of the scaling coefficients assume the value n and the value of the frequency distribution also amounts to n.

The transformed frequency distribution is designated the scaling coefficient spectrum. This spectrum of the scaling coefficients is a unique map of the local and global properties of the point set analyzed.

Analogous to the above procedure the spectrum of the scaling coefficients of a point set corresponding to that investigated (that is to say, a point set obtained under the same or analogous conditions) having no density or correlation gradients is determined. This spectrum may be obtained either by an analytical approach, as in the example discussed below, or by simulation or by a suitable measurement of a corresponding point set. For this stochastic comparative set it is not necessary to assign the points to the corresponding values of the frequency distribution, only the spectrum of the scaling coefficients as such being required.

Established next is the difference or deviation of the scaling coefficient spectrum of the point set investigated from that of the comparative set. The degree of deviation between these spectra, corresponding to the dense or strongly correlated zones, is a measure of the occurrence of density or correlation gradients. The points of the set investigated, assigned to this departure part, identify the "structure" as the condition for the deviation in density or the correlation gradients.

This deviation may be determined in two ways: in the first method as described above, the spectra of the scaling coefficients are compared to each other. To get to the frequency distribution it is necessary in practical applications to "bin" the found scaling coefficients. From the width of these bins the statistical error for the values of the frequency distribution is determined, a large bin width signifying a small statistical error, but also a low resolution, however.

In the second method for determining the deviation of a given distribution to be anticipated, introducing an additional parameter in the form of the bin width is avoided. Instead of the scaling coefficient spectrum the cumulative or integral distribution function of the scaling coefficients is determined. For this purpose, each scaling coefficient value occurring is assigned the number of scaling coefficients measured greater or equal to the value concerned. This number is divided by the total number of the scaling coefficients measured. The dependency of the values (P(<a)) obtained from the division from the value (a) of the scaling coefficient represents the cumulative distribution function. Likewise, the cumulative distribution function is determined for a comparative set. The cumulative distribution function of the comparative set is standardized to agree with the cumulative distribution function of the set investigated for the highest values of the scaling coefficients existing. Like the spectra, the deviation of the cumulative distribution functions for small values of the scaling coefficients is a measure of the occurrence of density and correlation gradients.

Before going into special example embodiments the basic principle of the invention will now be explained with reference to FIGS. 1 to 3. FIGS. 1a, 2a and 3a each represent a two-dimensional pixel raster. "Black" pixels, representing "points" on a white background are designated by a cross.

Figure 1A:
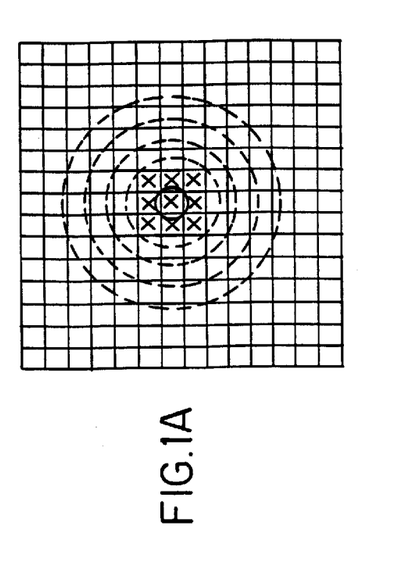
FIG. 1a is a simplified representation of a distribution of black pixels corresponding to a point in first approximation ("0 dimensional")
Figure 1B:
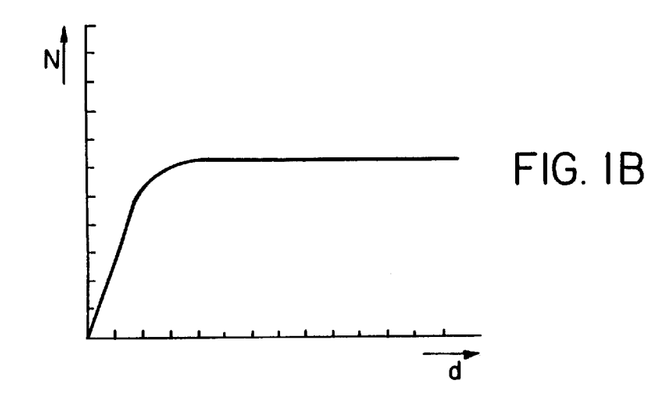
FIG. 1b is a plot representing schematically the number N of black pixels within an area assumed as being circular surrounding a prescribed pixel identified by a bold circle as a function of the radius of the area.

FIG. 1 shows, in the center of the raster, a spot-like distribution of black pixels which in a first approximation is point-like or zero-dimensional. Establishing the scaling coefficient will be explained by way of the middle black pixel, encircled bold. For this pixel the "density", more precisely, the number of points as a function of the diameter d of the area of the pixel (or as reckoned from the distance r from the middle of the pixel concerned) is determined. As evident from the plot in FIG. 1b, the number of black pixels in the area considered initially increases with increasing d, before then remaining constant, however. The degree of the power function, representing the constant main portion of the plot in FIG. 1b, and thus the scaling coefficient (or scaling exponent) of the density/distance function is accordingly zero.

Figure 2A:
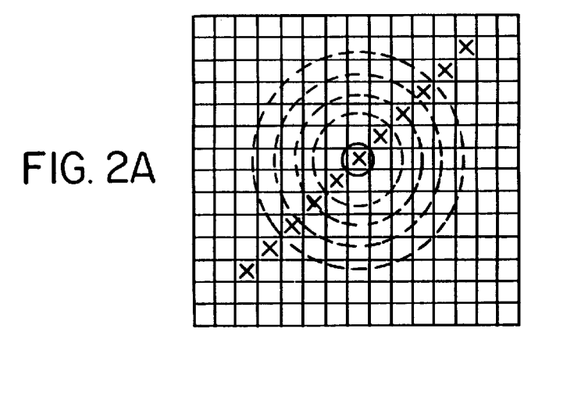
FIGS. 2a and 2b are representations in accordance with FIGS. 1a and 1b respectively for a linear (1-dimensional) distribution of black pixels.
Figure 2B:
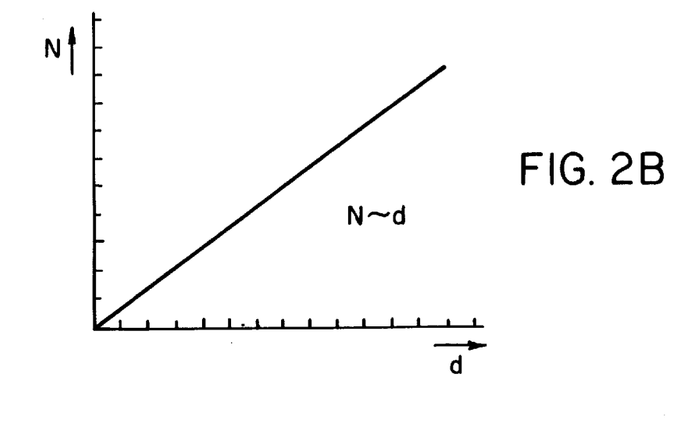

FIG. 2a shows a linear distribution of black pixels. Here too, we will consider the pixel bold encircled and determine the number of black pixels in the area of this pixel as a function of the diameter as indicated by dashed circles. Here, it is obvious that the number of pixels increases linearly with the diameter d. The density as a function of the diameter is a straight line and the scaling coefficient accordingly equals unity.

Figure 3A:
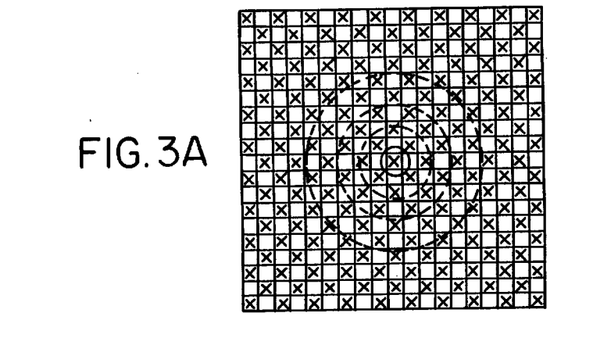
FIGS. 3a and 3b are representations in accordance with FIGS. 1a and 1b respectively for a surface-area (2-dimensional) distribution of black pixels.
Figure 3B:
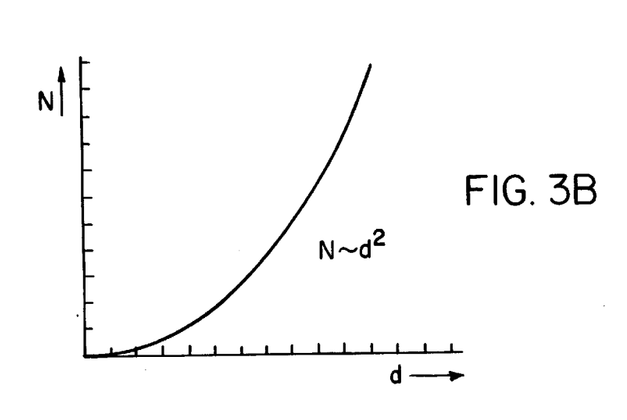

FIG. 3a shows an area distribution of black pixels. Here, the number of black pixels increases in proportion to the square of the diameter d. The scaling coefficient is accordingly two.

For distributions departing from those described above, other scaling coefficients, which may be non-whole numbers, materialize.

FIG. 4 illustrates the high validation sensitivity of the present method by way of a point set in a two-dimensional coordinate space. FIG. 4a represents a stochastic set of 900 points, FIG. 4b showing the point set in accordance with FIG. 4a, containing an additional 100 points in the middle with a Gaussian density distribution ("structure"). The 1σ radius of this Gaussian distribution is ⅛th of the field diameter. The structure is encircled.

Figure 4A:
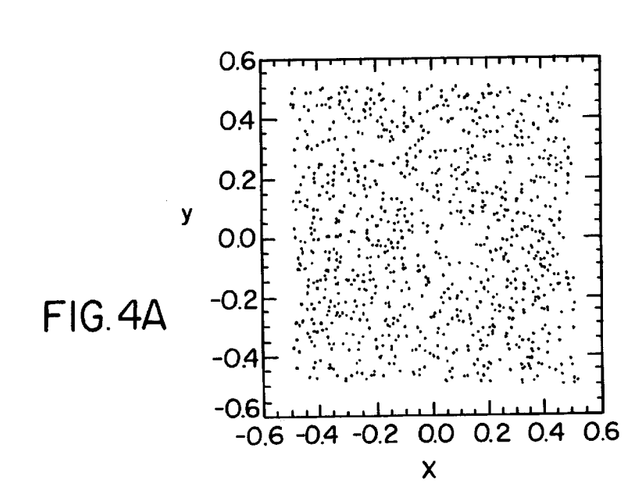
FIG. 4a is a two-dimensional set of 900 black points distributed stochastically on a white background.
Figure 4B:
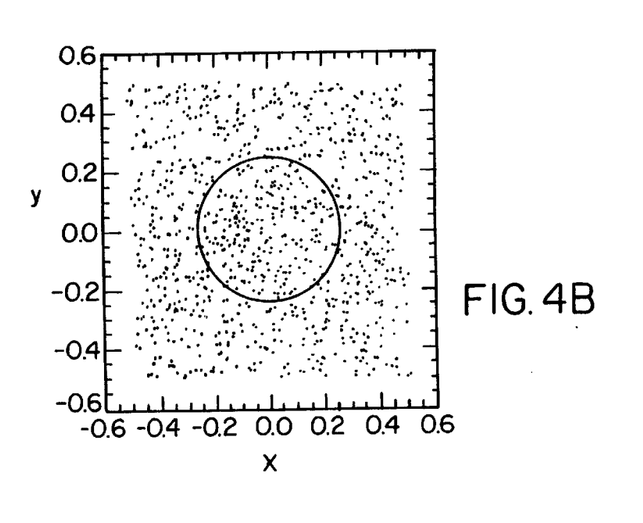
FIG. 4b is a point set in accordance with FIG. 4a in the middle of which an additional 100 points are arranged, corresponding to a structure with Gaussian distribution.
Figure 4C:
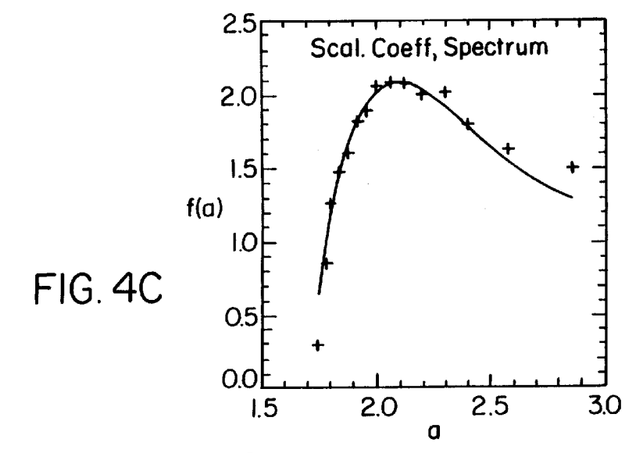
Figure 4D:
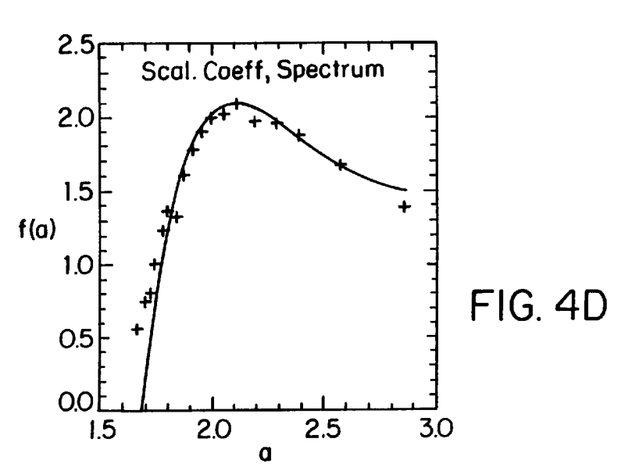
FIG. 4d is the spectrum of scaling coefficients of the point distribution in accordance with FIG. 4b.
Figure 4E:
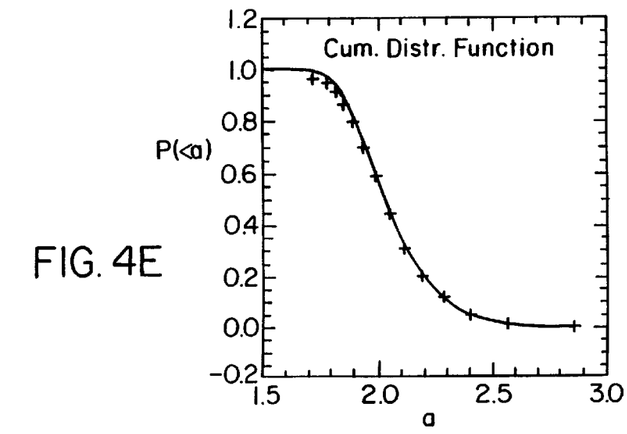
Figure 4F:
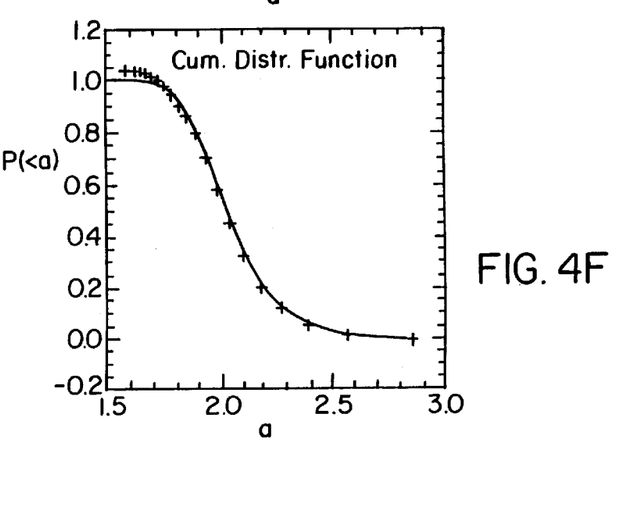
FIG. 4f is the cumulative distribution function of the point distribution in accordance with FIG. 4b.

FIGS. 4c and 4d illustrate the spectrum of the scaling coefficients for the stochastic point set in accordance with FIG. 4a or for the point set containing the structure as shown in FIG. 4b. FIGS. 4e and 4f plot the cumulative distribution function for the point set according to FIGS. 4a and 4b respectively.

In testing for whether a given point set contains a structure it is generally so, that the cumulative or integral distribution function of the point set to be investigated is adapted to the curve anticipated theoretically for a corresponding stochastic point set and that from this adaptation the number of the points stochastically distributed in the field investigated is determined. Should the number of stochastic points thus determined deviate significantly from the number of points existing totally in the field investigated, then the latter contains a structure as defined above. When this criterion is applied to 100 statistically independent fields generated In accordance with the method described in the previous paragraph, then for a departure of more than 2σ 95 fields are identified as being non-stochastic, whereby in 88 cases the number of stochastic points (900 points) is precisely determined to 1σ (30 points).

The cumulative distribution function thus permits recognizing whether the point distribution under consideration contains a structure.

Figure 5A:
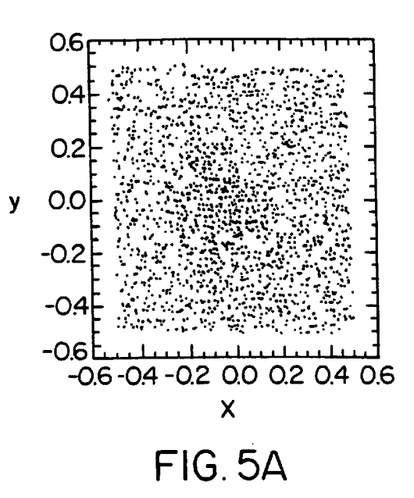
FIG. 5a is a photon map of the cluster A1314 detected by the X-ray satellite ROSAT.
Figure 5B:
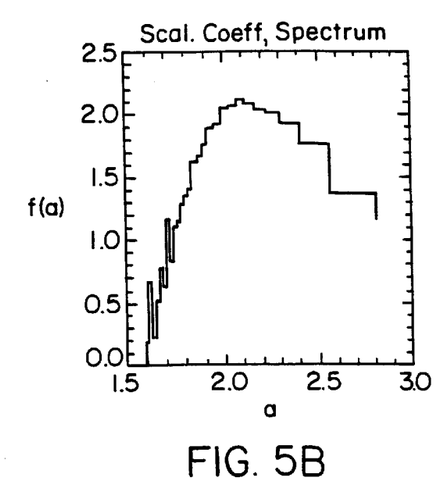

As a practical example FIG. 5a shows a photon map of the cluster A1314 as detected by the X-ray satellite ROSAT. "See *The Rosat Mission,*" J. Trümper, Adv. Space. Rec., Vol. 2, No. 4, pp. 241–249, 1983. Each photon registered by the detector of the satellite is assigned two space coordinate values an d an energy value in FIG. 5a every black point in the two-dimensional coordinate space corresponds to a detected photon, identified by its detector coordinates. For this point set the scaling coefficient spectrum is determined as plotted in FIG. 5b. This spectrum is compared to the spectrum of a set, the points of which are distributed stochastically. For such a random, stochastic point distribution the scaling coefficient spectrum may be determined analytically.

Figure 5C:
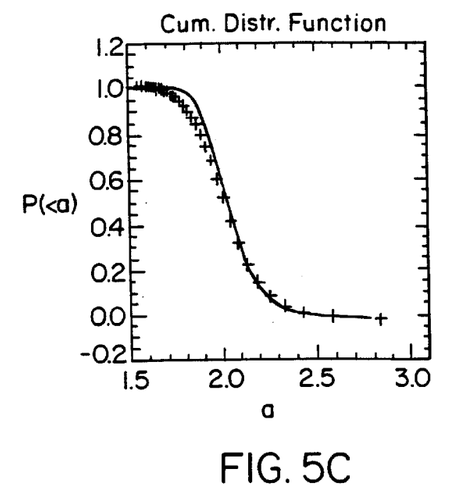

FIG. 5c is a plot of the cumulative distribution function of the point set in accordance with FIG. 5a (cross plot) and of the cumulative distribution function of the stochastic point set (line plot).

Figure 5D:
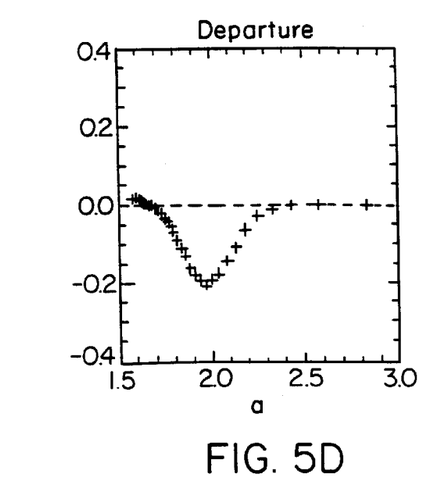
FIG. 5d is the deviation of the cumulative distribution function in accordance with FIG. 5c from the one statistical point distribution or set.
Figure 6A:
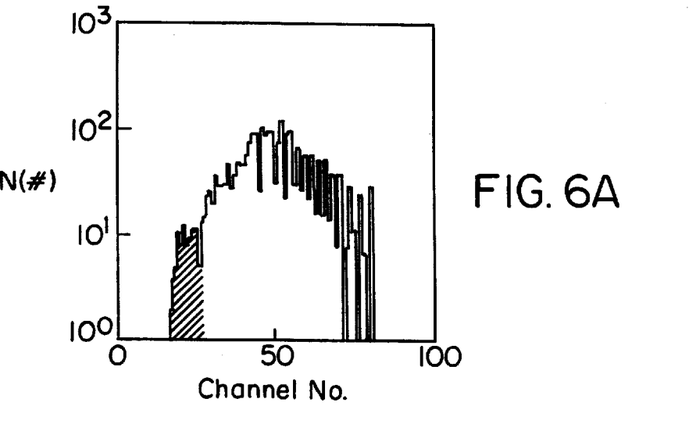
FIG. 6a is a spectrum of scaling coefficients for the point distribution in accordance with FIG. 5a with the addition of an energy coordinate.
Figure 6B:
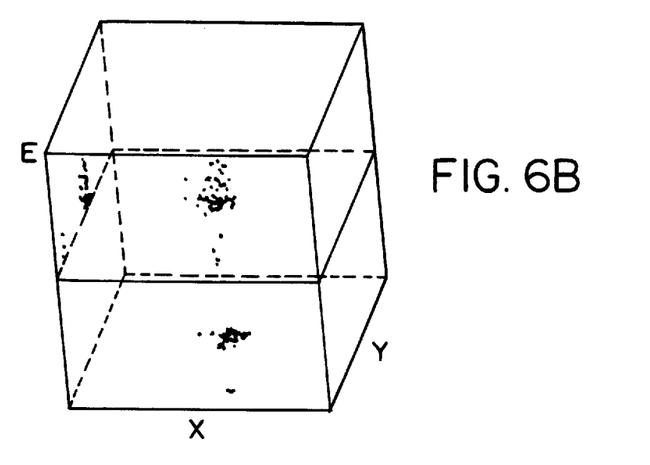
FIG. 6b represents the space coordinates and the energy of the points belonging to the shaded region of the spectrum of scaling coefficients in accordance with FIG. 6a following scaling to a unit cube.

FIG. 5d plots the departure of the cumulative distribution function of the point set in accordance with FIG. 5a from the cumulative distribution function of the stochastic set in this case, the departure is further increased by the energy being included as the third coordinate. The energy and the space coordinates were scaled on a unit cube and the scaling coefficient spectrum—plotted in FIG. 6a—determined from the resulting point set. The portion of the scaling coefficient spectrum relating back to the points causing the departure in FIG. 5a is designated shaded in FIG. 6a. When these points are plotted in a unit cube, the result is the spatial point distribution as depicted in FIG. 6b.

Figure 6C:
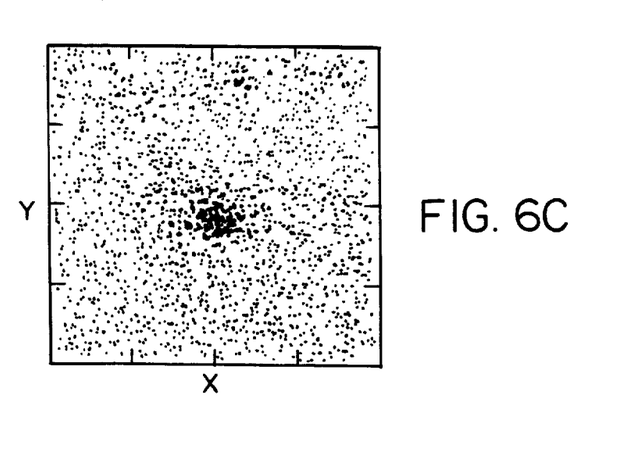
FIG. 6c is the projection of the distribution in the unit cube on the X-Y plane.

FIG. 6c shows the projection of this point distribution inn the xy plane in which also the original point distribution as shown in FIG. 5a is represented. The structure in accordance with FIG. 6c detected by the present method is a very good reproduction of the position and configuration of the cluster A1314.

Figure 7A:
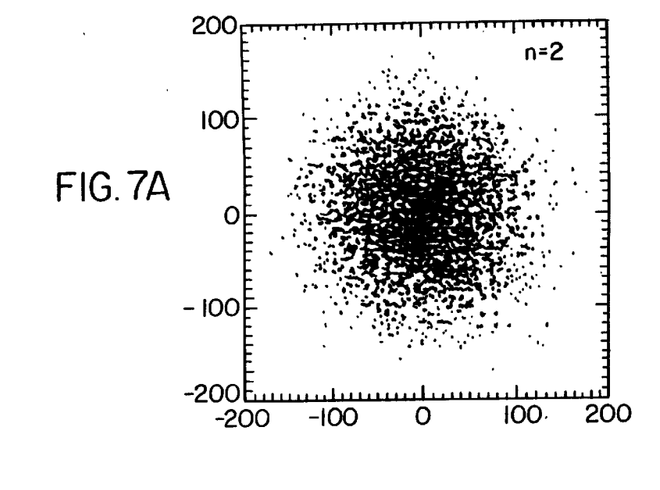
FIG. 7a is a point distribution corresponding to a sinusoidal signal buried in noise.
Figure 7B:
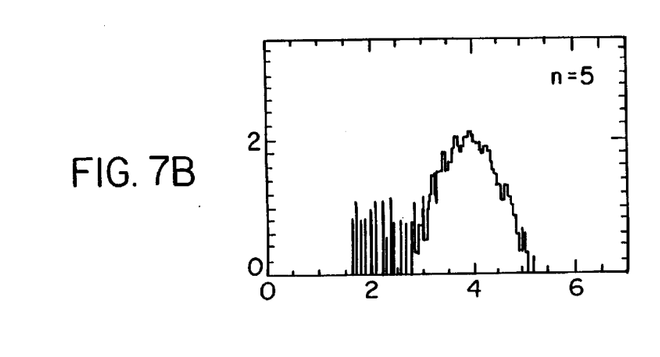
FIG. 7b is a spectrum of the scaling coefficients of the sinusoidal function buried in stochastic noise for a five-dimensional coordinate space.
Figure 7C:
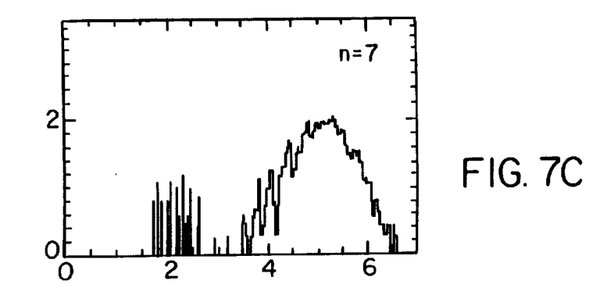
FIG. 7c is a spectrum of the scaling coefficients of the sinusoidal function buried in stochastic noise for a seven-dimensional coordinate space.

As a further example FIGS. 7a to 7d plot the evaluation of a point distribution (FIG. 7a) corresponding to an incomplete sinusoidal signal buried in noise. From a simulated time series, composed of an incomplete sinusoidal component and a complete stochastic component n-dimensional coordinate spaces were constructed (n=2,5,7). Each point in FIG. 7a is defined by a sequence of n measurement points, the first coordinate of the points passing through the time series as a whole. As the comparative set a time series containing only one stochastic component is employed. As FIGS. 7b and 7c show for n=5 and n=7 respectively, the dissociation of the stochastic components from the sinusoidal correlated components is greater with increasing dimension of the coordinate space.

Figure 7D:
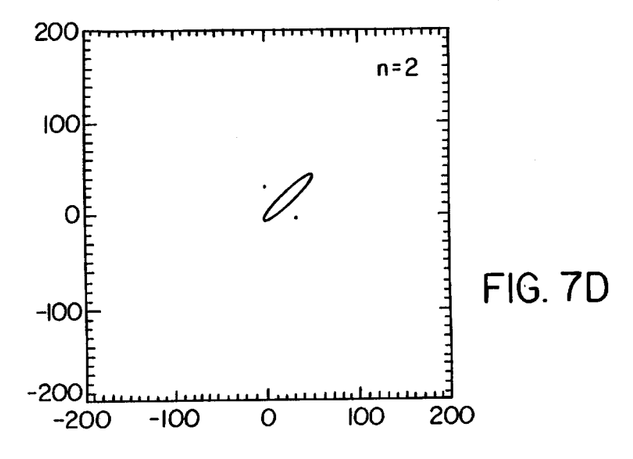
FIG. 7d represents the reconstructed structure obtained from the determining scaling coefficients of the given distribution less the scaling coefficients for a stochastic distribution.

FIG. 7d shows the reconstruction of the sinusoidal signal from a scaling coefficient spectrum for n=2.

Figure 8:
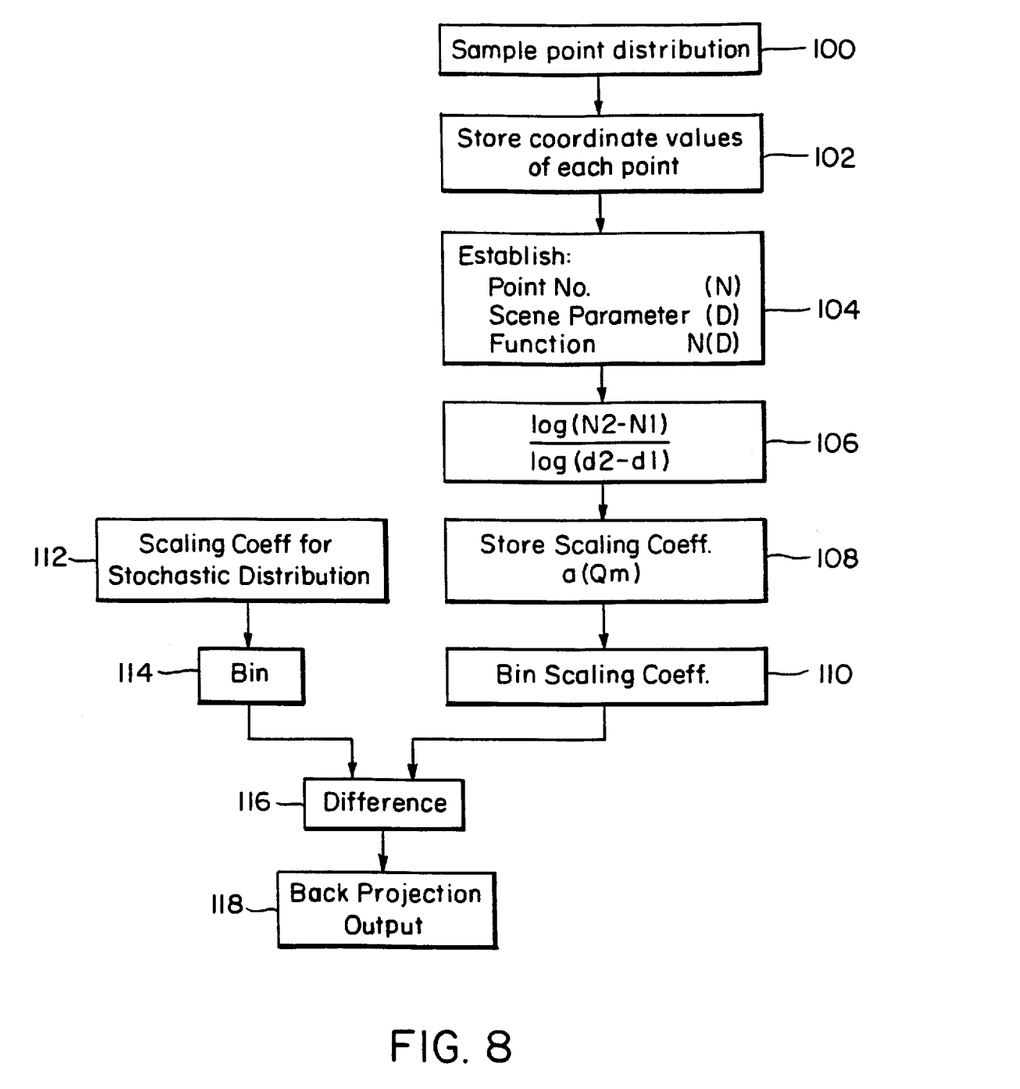
FIG. 8 is a function block diagram of a means for implementing the present method.

FIG. 8 shows a function block diagram of a means for implementing the spatial filtering method as described above on the basis of the scaling coefficient spectra, the individual units of the means being designated by their functions.

The point distribution to be filtered is first sampled in a sampler 100 for establishing the coordinate values of the points $Q_m$ of the point distribution.

The established coordinate values $x_{Qm}, y_{Qm}, \ldots$ are stored in a memory 102.

Connected to the memory 102 is an integrator 104 which interrogates the point coordinates stored in the memory 102 and establishes the point number/scene parameter function N(d).

A logarithmizer 106 establishes from the point number/area parameter function of the point $Q_m$ concerned the scaling coefficient $a(Q_m)$ thereof on the basis of the following formula $$\frac{\log(N2 - N1)}{\log(d2 - d1)}$$

where N1 and N2 signify the numbers of points in the area, having the dimensions d1 and d2 respectively. The result is the scaling coefficient $a(Q_m)$ of the point concerned $Q_m$ stored with the point coordinates in a memory 108. For this purpose the memory 102 may be used and the already stored coordinate values of the point concerned assigned to the established scaling coefficient.

Next, the scaling coefficients are interrogated from the memory 108 and binned in a discriminator 110.

The means according to FIG. 8 further comprise a memory 112, corresponding to the memory 102, and containing the coordinate values of a stochastic point distribution comparable to the point distribution to be evaluated. In a unit 114 connected to this memory the scaling coefficients for this stochastic distribution are established and binned corresponding to the bins of unit 110.

In a differentiator 116 the scaling coefficients of the stochastic distribution are deducted from the scaling coefficients of the point distribution to be evaluated. In conclusion the points corresponding to the scaling coefficients remaining from the differentiation are "projected back" in an output unit 118, that is to say, they are represented in an n-dimensional space like the sampled point distribution by means of a printer and/or a monitor and further-processed as a filtered distribution of values by other means.

The stages 102 to 116 may be achieved by discrete modules or by a microprocessor.

What is claimed is:

1. A method of spatial filtering structure coordinates of a point distribution representing a structure buried in a background, each point of the structure being defined by n coordinate values of an n-dimensional space, comprising the steps:

a) for each point ($Q_m$) a function is determined which represents the number (N) of the points in an area around the point concerned as the function of a dimension (d) of the area;

b) for each point a scaling coefficient ($a(Q_m)$) equal to the exponent (a) of a simple power function $$N \approx d^a$$

is determined which approximates as near as possible the function determined in step a) in a certain range of the dimension (d);

c) a frequency distribution of the scaling coefficients is determined;

d) for each point of a n-dimensional comparative background point distribution of a type equivalent to the point distribution to be filtered a scaling coefficient is determined analog to steps a) and b);

e) a frequency distribution of the scaling coefficients of the background point distribution is determined;

f) the difference between the frequency distributions of the scaling coefficients of the point distribution to be filtered and the background point distribution, respectively, is determined; and g) the points the scaling coefficients of which are contained in the difference, and which represent the structure substantially free of background, are represented in at least a two-dimensional space.

2. A method of spatial filtering structure coordinates of a point distribution representing a structure buried in a background, each point of the structure being defined by n coordinate values of an n-dimensional space, comprising the method steps:

a) for each point ($Q_m$) a function is determined which represents the number (N) of the points in an area around the point concerned as the function of a dimension (d) of the area;

b) for each point a scaling coefficient ($a(Q_m)$) equal to the exponent (a) of a simple power function $$N \approx d^a$$

is determined which approximates as near as possible the function determined in step a) in a certain range of the dimension (d);

c) for each point of a n-dimensional comparative background point distribution of a type equivalent to the point distribution to be filtered, a scaling coefficient is determined analog to steps a) and b)

d) each existing value of the scaling coefficients of the point distribution to be filtered and the background point distribution, respectively, is assigned a cumulative number, P(<a) equal to the number of scaling coefficients of the distribution concerned which are greater than or equal to the corresponding scaling coefficients, divided by the total number of the measured scaling coefficients of the distribution concerned, the cumulative numbers of the background point distribution determined in this step being scaled such that they agree by their highest numerical value with the highest numerical values for the distribution to be filtered;

e) the bins of the scaling coefficients of the point distribution to be filtered and the background point distribution, respectively, are split up into sub-bins;

f) for each sub-bin, the difference between the associated cumulative numbers determined in step d) of the point distribution to be filtered and the background point distribution is generated; and g) the points the scaling coefficients of which are contained in the difference and represent the structure substantially free of background are represented in at least a two-dimensional space.

3. The method as set forth in claims 1 or 2, wherein said step a) comprises the following sub-steps:

a1) the point distribution is sampled and the coordinate values determined thereby for the individual point ($Q_m$) are stored, and a2) for each point coordinate, the neighboring coordinates are interrogated by searching through the stored values as to whether the point of a corresponding coordinate exists, and the number of points determined thereby is stored as the function of the dimension (d).

4. The method as set forth in claim 1, characterized in that said step b) includes the following sub-steps:

b1) the function log N≈a log d is determined, N being the number of points and d a dimension of the area of the point being considered; and b2) the slope of a substantially straight portion of this function is established and used as a spatial coefficient.

5. A device for spatial filtering structure coordinates of a point distribution representing a structure buried in a background, each point of the structure being defined by n coordinate values of an n-dimensional space, comprising:

a) a means (100) for determining the coordinate values of each point;

b) a memory (102) for storing the coordinate values of each point;

c) a calculating means (104, 106, 108) determining, for each point, a scaling coefficient equal to the exponent (a) of a simple power function, $$N \approx d^a$$

representing the number (N) of points in an area of the point concerned as a function of a dimension (d) of the scene;

d) a device (112) for providing scaling coefficients of the points of a n-dimensional background point distribution of a type equivalent to the point distribution to be filtered;

e) a device (116) for selecting the points of the point distribution to be filtered which lie in a range of the scaling coefficients in which a distribution of the scaling coefficients of the point distribution to be filtered substantially differs from the distribution of the scaling coefficients of the background point distribution; and f) a device for representing the points to which the selected scaling coefficients are assigned.

* * * * *